W. H. ELLIOT.
Hay-Fork.
No. 59,570.          Patented Nov. 13, 1866.
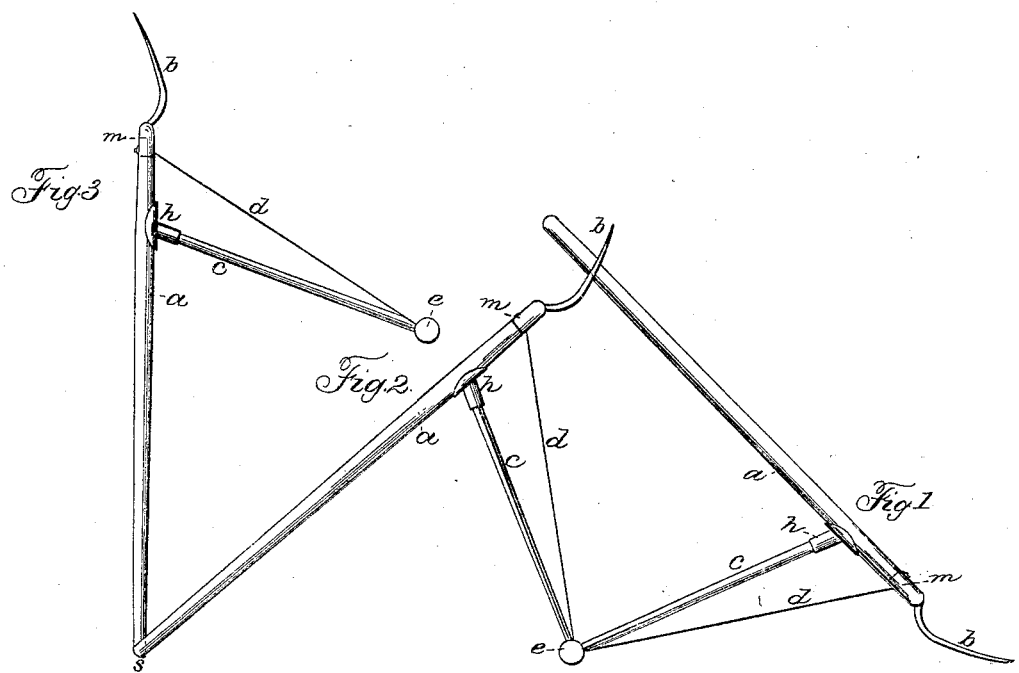
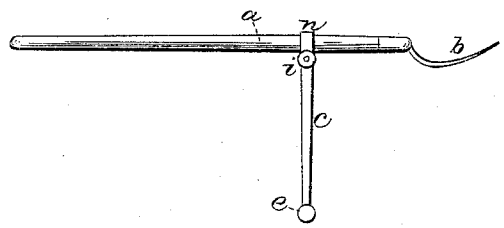
Witnesses.
Thos. Richardson
R. W. Meyers
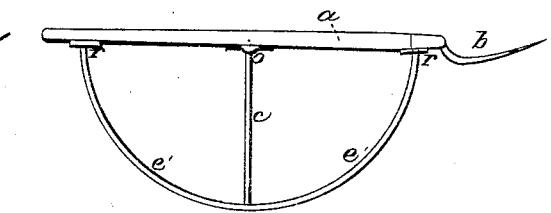
Inventor.
W. H. Elliot

UNITED STATES PATENT OFFICE.

W. H. ELLIOT, OF NEW YORK, N. Y.

IMPROVEMENT IN HAY-FORKS.

Specification forming part of Letters Patent No. 59,570, dated November 13, 1866.

*To all whom it may concern:*

Be it known that I, W. H. ELLIOT, of the city, county, and State of New York, have invented a new and Improved Fork for Loading Hay; and I do hereby declare that the following is a full and exact description thereof, reference being had to the accompanying drawings, and to the letters of reference marked thereon.

Similar letters indicate the same devices in all the figures.

The nature of my invention consists in providing a pitching-fork for loading hay with a support and fulcrums, by which the hay may be raised a certain distance from the ground by using the fork-handle as a lever upon said support and fulcrum, and in so arranging said support and fulcrum in relation to the fork-handle, and in so attaching them to the same, that while they give the desired support to the fork they are so far out of the way of the hand as not to be inconvenient to the pitcher.

Figures 1, 2, and 3, represent my improved fork in the several positions it assumes when being used. Fig. 4 represents a fork with a jointed support. Fig. 5 represents a fork with a continuous support or fulcrum, upon which the fork rolls like a wheel.

$a$ is the handle; $b$, the tines; $c$, the support; $d$, brace of the same; $e$, fulcrum, which rests upon the ground; $h$, iron socket, screwed to the handle, into which the support is inserted; $i$, joint between the support and handle; $m$, ferrule.

The object of my invention is to save, as far as possible, that muscular strain which is occasioned by pitching hay from the ground with the forks in general use, and which is so great with the majority of men as to make hay-pitching the most dreaded of all their labors.

The operation of my improved fork is as follows: When the fork has been inserted into the hay upon the ground it assumes the position of Fig. 1. The handle is then forced backward and downward to the position shown in Fig. 2. The pitcher then places his foot before the end of the handle at $s$ and draws the fork to a vertical position, as seen at Fig. 3. Thus hay is raised from the ground to a height of six feet without lifting at all from the position of Fig. 3. The hay is carried to the top of the load in the usual way. The time occupied in taking the hay from the ground and placing it upon the hay-rack is but little, if any, greater than that occupied by the ordinary method.

A little experience in the use of my improved fork enables the pitcher to keep the hay in motion from the time it leaves the ground till it reaches the top of the load, all of which is performed without stooping.

Fig. 4 represents a fork having the support $c$ jointed to the band $n$, upon the fork-handle at $i$. In the use of this fork there is considerable difficulty in balancing the load. For this reason the support and fulcrum should be rigidly fixed to the fork-handle, and braced to give it strength, as shown in the first three figures.

By so arranging the support in relation to the fork-handle that the former forms an acute angle with the lower end of the latter, (see Fig. 3,) the support and its socket are entirely out of the way of the hand, while the fulcrum $e$ is in the right position to facilitate the operation of the fork.

$e'$, Fig. 5, shows a continuous fulcrum, like the rim of a wheel. This fulcrum or rim is attached to the handle at $r$ $r$, and has a support which is attached to the handle at $o$. The fork with its load rolls upon the fulcrum or rim when the hay is raised.

Having described my invention, what I desire to secure by Letters Patent is—

1. The employment of support $c$, in combination with and arranged under the fork and resting upon the ground, substantially as described.

2. The arrangement of support $c$ at an acute angle with the fork-handle, substantially and for the purpose specified.

3. The fulcrum $e$, when permanently fixed in relation to the fork by means of support $c$ and brace $d$, or their equivalents, substantially as set forth.

W. H. ELLIOT.

Witnesses:
 THOS. RICHARDSON,
 R. M. MYERS.